United States Patent
Govindassamy et al.

(10) Patent No.: US 10,587,425 B2
(45) Date of Patent: Mar. 10, 2020

(54) REAL-TIME CO-ORDINATED FULFILLMENT OF REFILL TRANSACTIONS OF A USER ACCOUNT IN A COMMUNICATION SYSTEM

(71) Applicant: Telefonaktiebolaget LM Ericsson (publ), Stockholm (SE)

(72) Inventors: Meenakshi Sundaram Govindassamy, Chennai (IN); Karthikeyan Premkumar, Chennai (IN)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/086,959

(22) PCT Filed: Mar. 23, 2016

(86) PCT No.: PCT/IN2016/050092
§ 371 (c)(1),
(2) Date: Sep. 20, 2018

(87) PCT Pub. No.: WO2017/163255
PCT Pub. Date: Sep. 28, 2017

(65) Prior Publication Data
US 2019/0123921 A1 Apr. 25, 2019

(51) Int. Cl.
*H04W 4/24* (2018.01)
*H04L 12/14* (2006.01)
*H04M 15/00* (2006.01)
*H04M 17/00* (2006.01)

(52) U.S. Cl.
CPC ...... *H04L 12/1407* (2013.01); *H04L 12/1467* (2013.01); *H04M 15/59* (2013.01);
(Continued)

(58) Field of Classification Search
CPC . H04L 12/1407; H04L 12/1467; H04L 12/14; H04W 4/24; H04W 4/00;
(Continued)

(56) References Cited

U.S. PATENT DOCUMENTS

| 8,660,521 B1 * | 2/2014 | Daniel | H04W 4/50 |
| | | | 455/405 |
| 2004/0062371 A1 * | 4/2004 | Maropis | H04M 15/00 |
| | | | 379/114.2 |

(Continued)

FOREIGN PATENT DOCUMENTS

CN 101374056 A 2/2009

OTHER PUBLICATIONS

International Search Report and Written Opinion dated Aug. 8, 2016 for International Application No. PCT/IN2016/050092 filed on Mar. 23, 2016, consisting of 7-pages.
(Continued)

*Primary Examiner* — Chuong A Ngo
(74) *Attorney, Agent, or Firm* — Christopher & Weisberg, P.A.

(57) ABSTRACT

The present disclosure relates to a method related to an online charging system for a cellular radio communication system. The method includes obtaining a notification that a refill action of a user account for the communication system is pending. The notification includes an identifier (vid) of a refill resource for the refill action. The method also includes inspecting a refill database updated by an account management function of the online charging system to determine whether the refill resource identifier is included therein, indicating whether or not the user account has been refilled based on the refill resource.

8 Claims, 6 Drawing Sheets

(52) U.S. Cl.
CPC ........... *H04M 15/64* (2013.01); *H04M 15/66* (2013.01); *H04M 15/855* (2013.01); *H04M 15/856* (2013.01); *H04M 17/204* (2013.01); *H04W 4/24* (2013.01)

(58) Field of Classification Search
CPC ...... H04M 15/00; H04M 15/59; H04M 15/64; H04M 15/66; H04M 15/83; H04M 15/85; H04M 15/855; H04M 15/856; H04M 17/02; H04M 17/20; H04M 17/204
See application file for complete search history.

(56) References Cited

U.S. PATENT DOCUMENTS

2009/0047926 A1* 2/2009 Mastrantuono ........ G06Q 30/04
455/405
2013/0237080 A1 9/2013 Cheuk et al.

OTHER PUBLICATIONS

ETSI TS 132 296 V15.0.0; Digital cellular telecommunications system (Phase 2+) (GSM); Universal Mobile Telecommunications System (UMTS); LTE; Telecommunication management; Charging management; Online Charging System (OCS): Applications and Interfaces; 3GPP TS 32.296 version 15.0.0 Release 15, consisting of 95-pages.
European Search Report dated Sep. 24, 2019 for Application No. 16895313.1, consisting of 11-pages.

* cited by examiner

REAL-TIME CO-ORDINATED FULFILLMENT OF REFILL TRANSACTIONS OF A USER ACCOUNT IN A COMMUNICATION SYSTEM

CROSS-REFERENCE TO RELATED APPLICATIONS

This application is a Submission Under 35 U.S.C. § 371 for U.S. National Stage Patent Application of International Application Number: PCT/IN2016/050092, filed Mar. 23, 2016 entitled "REAL-TIME CO-ORDINATED FULFILLMENT OF REFILL TRANSACTIONS OF A USER ACCOUNT IN A COMMUNICATION SYSTEM," the entirety of which is incorporated herein by reference.

TECHNICAL FIELD

The present disclosure relates to methods and devices for an online charging system for refilling a user account of a cellular radio communication system.

BACKGROUND

A recharge/refill of an account with a telecommunications operator is performed by a mobile user in order to keep the balance (amount or units for example Euro, seconds, bytes or the like) at a suitable level for allowing day to day activities such as calling/texting/browsing etc. A suitable balance has to be maintained in a prepaid subscription. A mobile user uses a voucher which can be described as an entity which is in a physical form, for example a printed coupon, paper containing a secret code, or non-physical form, for instance an encrypted secret code sent in an email/online etc.

The Interface between the OCS (Online Charging System) and the external recharge server is shown in FIG. 1 as in accordance with the Third Generation Partnership Project (3GPP) Technical Specification (TS) 32.296. The OCS interacts with the operator support network, or a hosted network e.g. a retail shop, (right hand side in the figure) as well as with different parts of a radio communication network, including core network(s) (CN) and Radio Access Network(s) (RAN) on the left hand side in the figure. Abbreviations used are in accordance with standards: PCRF (Policy and Charging Rules Function), MSC (Mobile Switching Center), SGSN (Serving GPRS Support Node), PGW (PDN Gateway), WLAN (Wireless Local Area Network), IMS (IP Multimedia Subsystem), CSCF (Call Session Control Function), AS (Application Server), MRFC (Media Resource Function Controller), MMS (Multimedia Messaging Service), GMLC (Gateway Mobile Location Centre), MBMS (Multimedia Broadcast Multicast Service), PoC (Push-to-Talk over Cellular, SMS (Short Message Service). Between the OCS and the recharging server there is an interface Rr as an online reference point.

FIG. 2 illustrates the refill sequence of a prepaid account, where MS is a mobile station, ABMF is here the account balance management function and the VDB is a voucher database (DB).

The steps involved in the refill process are explained below.
1. A mobile station (used by a mobile user) initiates a refill request.
2. The refill request reaches a recharge server which validates the same with the VDB and determines the balance which should be added, after applying any discounts/promotions. The validation process involves the recharge server contacting the VDB for availability, authenticity, and authorization of the voucher.
3. After validation, the recharge server contacts the ABMF to update the balance of the mobile user account.
4. The ABMF updates the balance of the prepaid account of the mobile user in the balance database.

In the above process there are cases where the update transactions are lost due to e.g. network issues either during the update of the balance or during the update of the voucher. Due to this, the user balance is not updated or the voucher state is incorrect i.e. voucher state may be set to used while still the user balance is not updated, or set to unused even if the user balance has been updated. This may lead to inconsistent revenue management due to non-fulfilment of refill transactions, and customer churn due to poor user experience, since it would require more time & effort by means of customer care support and multi-level approval processes involved in clearing a voucher for manual rectification.

FIG. 3 is a signalling diagram illustrating how communications can get lost which would require manual assistance to get the update of balance and/or voucher state correct (vid is the voucher identifier (ID), and amt is the amount with which the account should be updated). If any of the messages 4-7 get lost or are otherwise corrupt or not received correctly, the recharge server will not know whether the account was updated or not. In that case, the voucher may not be set to neither used nor unused state, but rather as pending. This needs then be sorted out manually, as illustrated in FIG. 4.

In a normal case, a voucher transition from Unused state to Locked state (1. Reserve) during a Refill transaction, and from a Locked state it moves to Used state (3. RefillDone-System) if the Refill is successful or reverts back to Unused state (3'. RefillNotDone-System) if the Refill is unsuccessful. In case of no acknowledgement due to a communication failure or programmatic error after a certain time period, then the voucher state is moved to Pending state (2. Timeout). Vouchers with Used state are Archived (4. Archive). Refill(Not)Done-System means refill is handled by the Recharge Server. Refill(Not)Done-Manual means refill is handled by manual intervention.

SUMMARY

It is an objective of the present disclosure to improve handling of situations with pending vouchers and the like, herein generally called a refill resource, reducing the manual handling thereof, for refilling (also called charging) a user account, e.g. a prepaid or postpaid account.

According to an aspect of the present disclosure, there is provided a method related to an online charging system for a cellular radio communication system, e.g. performed by a refill error correction module/function as discussed herein. The method comprises obtaining a notification that a refill action of a user account for the communication system is pending. The notification comprises an identifier of a refill resource for the refill action. The method also comprises inspecting a refill database updated by an account management function of the online charging system to determine whether the refill resource identifier is comprised therein, indicating whether the user account has been refilled based on the refill resource or not.

According to another aspect of the present disclosure, there is provided a computer program product comprising computer-executable components for causing a refill error correction module to perform an embodiment of a method of the present disclosure when the computer-executable components are run on processor circuitry comprised in the refill error correction module.

According to another aspect of the present disclosure, there is provided a refill error correction module for being related to an online charging system for a cellular radio communication system. The refill error correction module comprises processor circuitry, and storage storing instructions executable by said processor circuitry whereby said refill error correction module is operative to obtain a notification that a refill action of a user account for the communication system is pending, the notification comprising an identifier of a refill resource for the refill action. The refill error correction module is also operative to inspect a refill database updated by an account management function of the online charging system to determine whether the refill resource identifier is comprised therein, indicating whether the user account has been refilled based on the refill resource or not.

According to another aspect of the present disclosure, there is provided a method performed by a refill access point associated with an online charging system for a cellular radio communication system. The method comprises determining that a refill action of a user account for the communication system is pending. The method also comprises generating a notification to a refill error correction function. The notification comprises an identifier of a refill resource for the pending refill action.

According to another aspect of the present disclosure, there is provided a computer program product comprising computer-executable components for causing a refill access point to perform an embodiment of a method of the present disclosure when the computer-executable components are run on processor circuitry comprised in the refill access point.

According to another aspect of the present disclosure, there is provided a refill access point for being associated with an online charging system for a cellular radio communication system. The refill access point comprises processor circuitry, and storage storing instructions executable by said processor circuitry whereby said refill access point is operative to determine that a refill action of a user account for the communication system is pending. The refill access point is also operative to generate a notification to a refill error correction function, the notification comprising an identifier of a refill resource for the pending refill action.

According to another aspect of the present disclosure, there is provided a method performed by an account management function of an online charging system for a cellular radio communication system. The method comprises obtaining an update balance request for a refill action of a user account for the communication system, the request comprising an identifier of a refill resource for the refill action. The method also comprises initiating updating a balance of the user account in accordance with the refill action. The method also comprises updating a refill database by including the refill resource identifier. The method also comprises sending a confirmation message confirming that the user account has been refilled based on the refill resource.

According to another aspect of the present disclosure, there is provided a computer program product comprising computer-executable components for causing an account management module to perform an embodiment of a method of the present disclosure when the computer-executable components are run on processor circuitry comprised in the account management module.

According to another aspect of the present disclosure, there is provided an account management module for an online charging system for a cellular radio communication system. The account management module comprises processor circuitry, and storage storing instructions executable by said processor circuitry whereby said account management module is operative to obtain an update balance request for a refill action of a user account for the communication system, the request comprising an identifier of a refill resource for the refill action. The account management module is also operative to initiate updating a balance of the user account in accordance with the refill action. The account management module is also operative to update a refill database by including the refill resource identifier. The account management module is also operative to send a confirmation message confirming that the user account has been refilled based on the refill resource.

According to another aspect of the present disclosure, there is provided a computer program comprising computer program code which is able to, when run on processor circuitry of a refill error correction module related to an online charging system for a cellular radio communication system, cause the refill error correction module to obtain a notification that a refill action of a user account for the communication system is pending, the notification comprising an identifier of a refill resource for the refill action. The code is also able to cause the refill error correction module to inspect a refill database updated by an account management function of the online charging system to determine whether the refill resource identifier is comprised therein, indicating whether the user account has been refilled based on the refill resource or not.

According to another aspect of the present disclosure, there is provided a computer program comprising computer program code which is able to, when run on processor circuitry of a refill access point associated with an online charging system for a cellular radio communication system, cause the refill access point to determine that a refill action of a user account for the communication system is pending. The code is also able to cause the refill access point to generate a notification to a refill error correction function, the notification comprising an identifier of a refill resource for the pending refill action.

According to another aspect of the present disclosure, there is provided a computer program comprising computer program code which is able to, when run on processor circuitry of an account management module for an online charging system for a cellular radio communication system, cause the account management module to obtain an update balance request for a refill action of a user account for the communication system, the request comprising an identifier of a refill resource for the refill action. The code is also able to cause the account management module to initiate updating a balance of the user account in accordance with the refill action. The code is also able to cause the account management module to update a refill database by including the refill resource identifier. The code is also able to cause the account management module to send a confirmation message confirming that the user account has been refilled based on the refill resource.

According to another aspect of the present disclosure, there is provided a computer program product comprising an embodiment of a computer program of the present disclosure and a computer readable means on which the computer program is stored.

By means of embodiments of the present disclosure, failed account refill operations can be automatically corrected with reduced manual handling and improved user experience. Typically, the user account may be a prepaid account, but could in some embodiments be a postpaid account.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Herein, the term Refill access point (AP) is used for a network element of which the 3GPP Recharge Server is an example. Also, the term Account Management is herein used for a network element of which the 3GPP Account Balance Management Function is an example. Herein, modules of a communication network are discussed. These modules may be hardware and/or software implemented and may in its turn comprise one or a plurality of modules (or submodules). A module may e.g. provide or perform a function. For instance, an account management module may perform/provide an account management function. Both the module and its function may be referred to as account management. Similar reasoning is applied to the refill error correction (module/function). A module, submodule, element, (access) point or other part of a communication system, as discussed herein, may comprise processing circuitry and/or data storage and/or communication interface. However, it should be noted that these may structurally be shared with other parts of the communication system e.g. if integrated in a node performing may different functions.

Embodiments of the present disclosure relates to methods enabling automatic identification of failed as well as successful refills with refill resources, such as vouchers, and taking corrective action, wherein an action could be 1. Automatic Re-triggering of Refill, in case of balance update not done
2. Update of the refill resource (voucher) state to used, in case of balance update is already done.

A failure (resulting in a pending refill resource) is identified by means of the scheduled process which collects the refill resource states and by comparing with the stored refill resource states in the account management system.

The present disclosure deals with refill resources with "Pending" state that may need to be updated depending on the status of the account balance update status (updated or not), which are today handled manually and can now instead be handled automatically in in accordance with the present disclosure.

Figure 1:
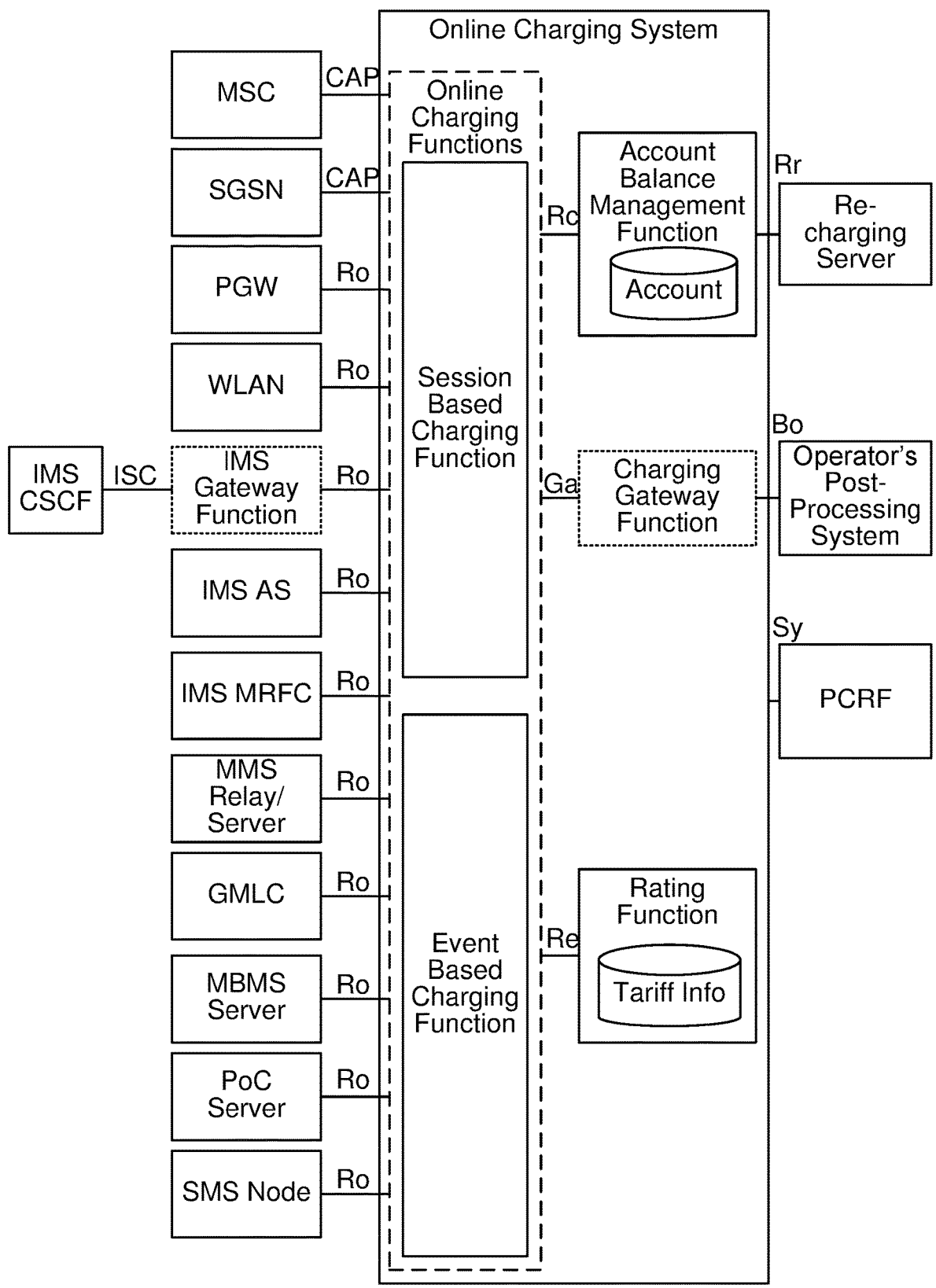
FIG. 1 is a block diagram illustrating an online charging system and its potential interfaces according to standards.
Figure 2:
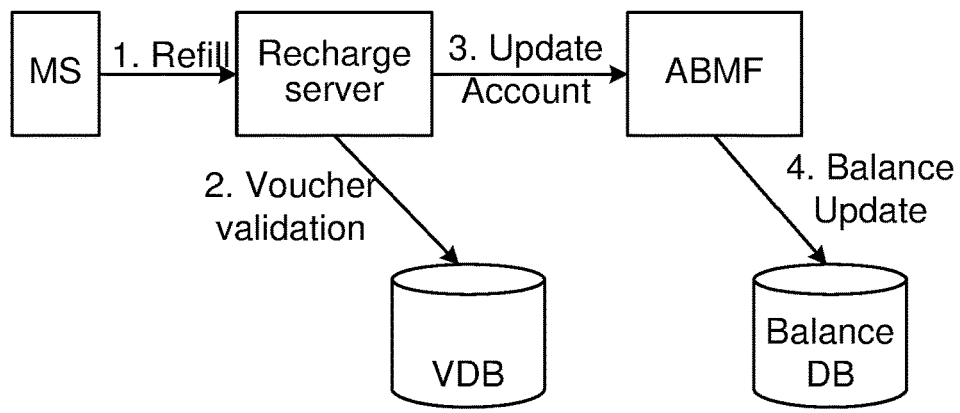
FIG. 2 illustrates a standard refill operation of a user account.
Figure 3:
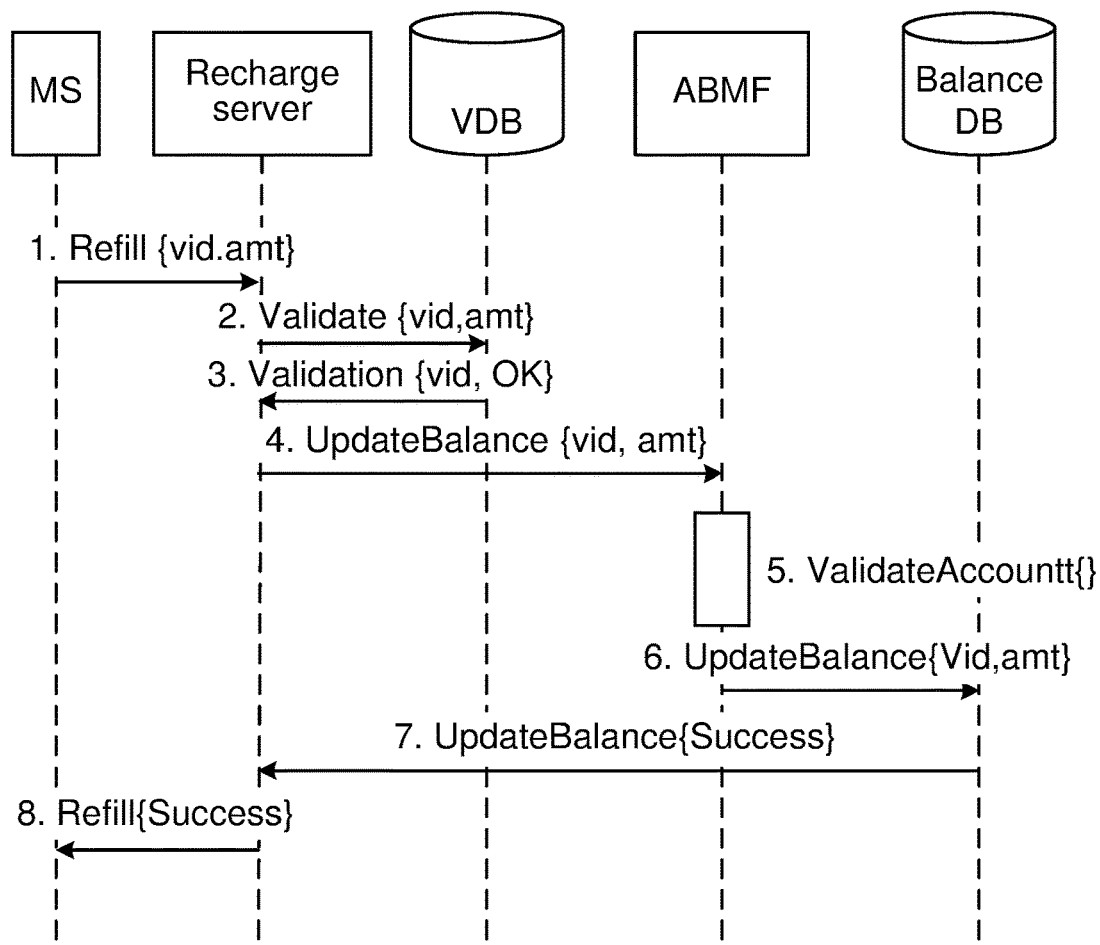
FIG. 3 is a signalling diagram illustrating a standard refill operation of a user account.
Figure 4:
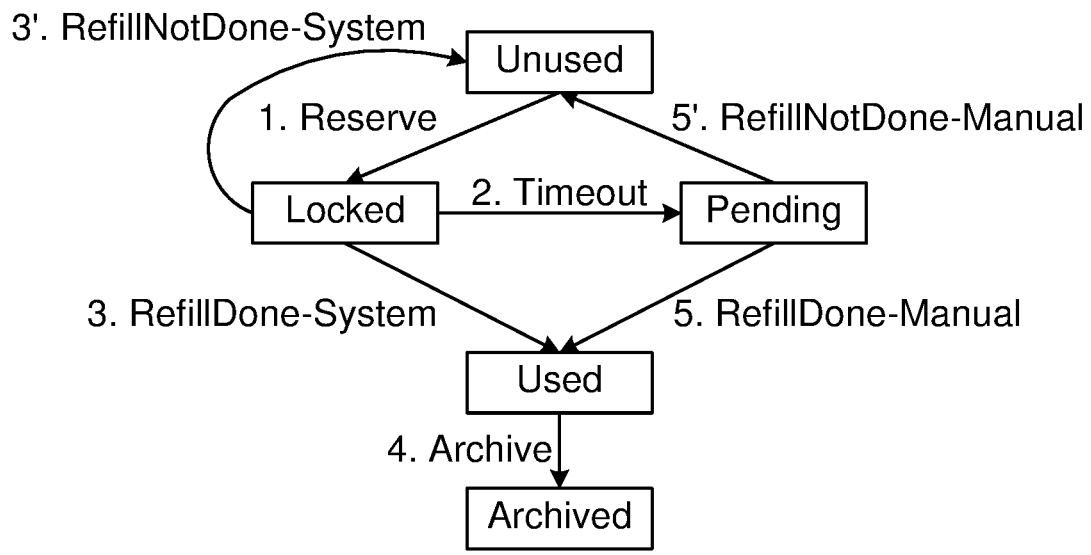
FIG. 4 is a diagram illustrating different states of a refill voucher for a user account.
Figure 5:
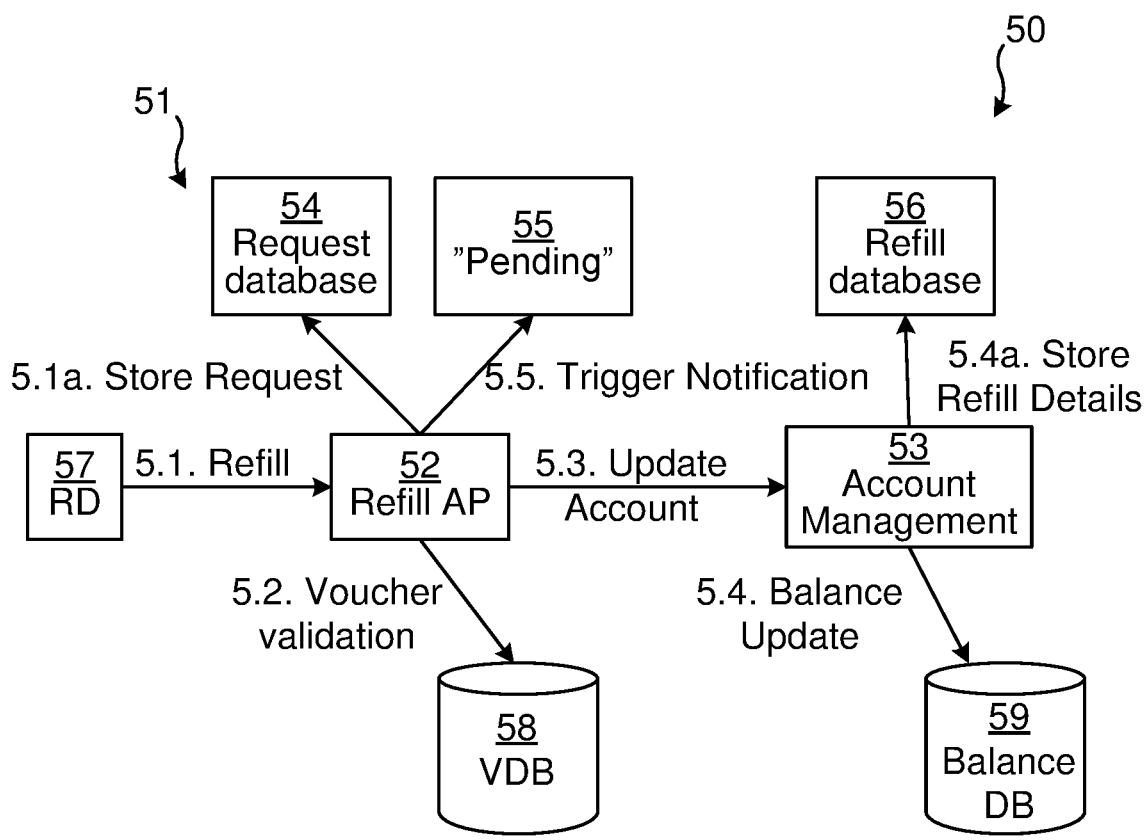
FIG. 5 is a schematic block diagram illustrating a refill operation of a user account in accordance with embodiments of the present disclosure.

FIG. 5 illustrates a refill operation in accordance with the present disclosure. The core is the same as illustrated in FIG. 2, with interaction between nodes in the OCS 50 and nodes in an operator support network 51, but with some additions to facilitate automatic handling of pending refill resources.

5.1: A radio device (RD) 57, e.g. a wireless phone or computer, (used by a mobile user) initiates a refill request. Herein, a radio device 57 is as an example used as the initiator of the refill request, but that is only one of many possible such channels for generating or otherwise initiating the refill request. Other possible refill channels include the user calling a customer care centre of the operator, online customer portals, banks/ATMs etc. 5.2: The refill request reaches the refill AP 52 which validates the same with the VDB 58 and determines the balance which should be added, after applying any discounts/promotions. The validation process involves the refill AP 52 contacting the VDB for availability, authenticity, and authorization of the voucher. 5.3: After validation, the refill AP contacts the account management 53 to update the balance of the mobile user account. 5.4: The account management updates the balance of the user account of the mobile user in the balance database 59. The additions to the refill operation in accordance with the present disclosures are outlined below.

5.1a: The refill access point 52 stores, in a request database 54, the complete incoming refill request received from a radio device (RD) 57, e.g. a wireless phone or computer. The request may include refill resource details, subscriber profile information, time information (e.g. time-zone), subscriber details such as location etc.

5.4a: The account management function 53 stores the details of an account balance update in relation to the refill resource identifier (vid) of a refill transaction.

5.5: The refill AP 52 triggers a notification 55 whenever a refill resource state is set to "Pending" state.

Figure 6A:
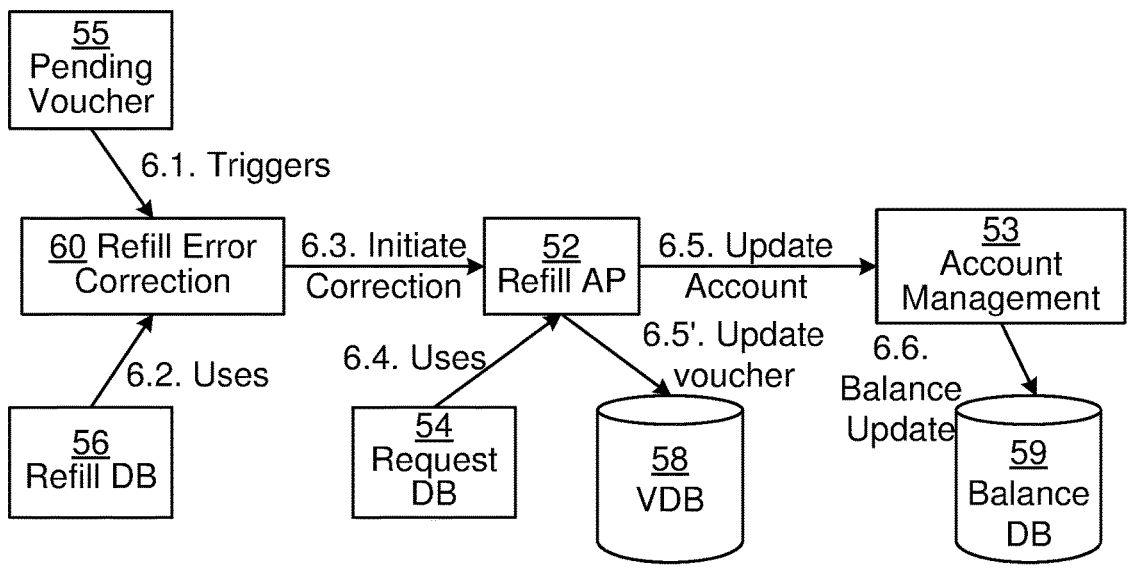
FIG. 6*a* is a schematic block diagram illustrating use of refill error correction for a refill operation of a user account in accordance with embodiments of the present disclosure.

By means of the additions outlined above, a new function, herein called a refill error correction function 60 is introduced as illustrated in FIG. 6*a*.

The refill error correction function 60 listens to the pending refill resource notification 55 from the refill AP 52 and uses the refill database (DB) 56 to identify the actual state of the account balance update by using the refill resource identifier as the reference key and takes the appropriate corrective action automatically. The corrective action depends on whether the refill resource identifier is present in the refill DB 56. If it is present, this indicates that the balance is updated for the account and refill has been done, hence the state of the pending refill resource is changed to "used" state to prevent any further usage. If, on the other hand, the refill resource identifier (vid) is not present in the refill DB 56, then the refill error correction function 60 triggers a retrigger refill action to the refill AP 52 and the request DB 54 in which information about the refill request of the original refill action was stored, is used to trigger an additional refill action, e.g. a new refill request may be reconstructed based on the stored information in the request DB 54 which mimics such a refill request sent from the RD 56. Hence, if this additional refill action is successful, the refill is performed and the refill resource state will be moved from "Pending" to "Used".

Additionally, a retention period may be set for how long to keep (for example number of days) the entries in the refill and request databases, respectively, before overwriting the information. The refill error correction module/function 60 may be associated with a repeat counter or timer in order to stop additional refill actions from being formed after a predetermined number of unsuccessful attempts or expiry of a timer in case of prolonged network issues. Further additional refill actions may then again be triggered e.g. after a predetermined time period.

Figure 6B:
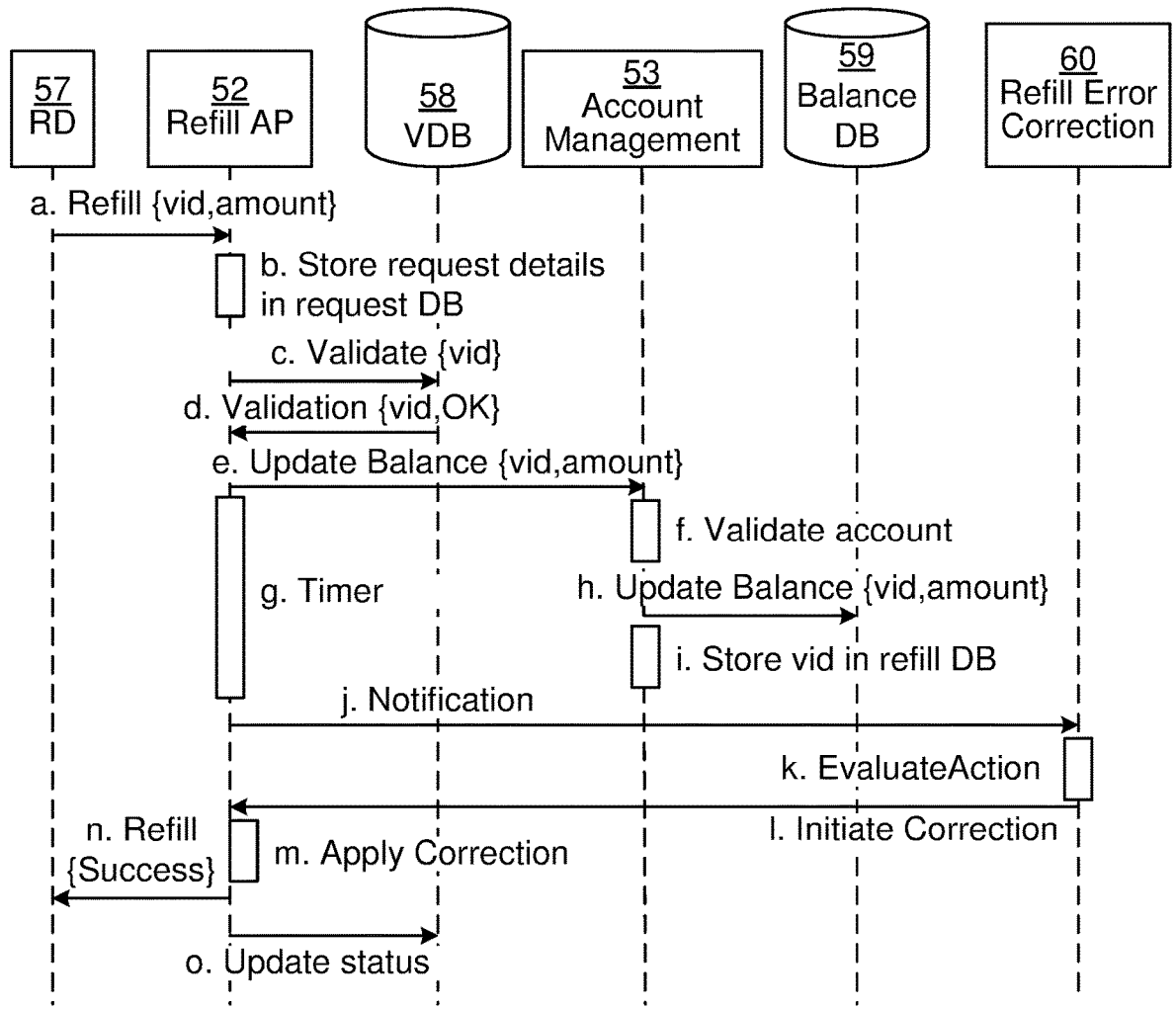
FIG. 6*b* is a schematic signalling diagram corresponding to embodiments of the present disclosure.

FIG. 6*b* illustrates typical signalling between the blocks in FIGS. 5 and 6*a*, in accordance with the present disclosure. The radio device 56 sends a refill request (a) comprising the refill resource identifier (vid) and the refill amount. The refill AP sends (b) refill request details to be stored in the request DB 54. The refill AP 52 sends a validation request c, comprising the vid, to the VDB 58 which responds with a validation response d, comprising the vid, indicating that the refill resource is OK (e.g. not already used). The refill AP 52 then sends an update balance request (e), including the vid as well as the amount, to the account management 53. The account management validates (f) the account and sends an update balance order (h), including the vid and the amount, to the balance DB 59. Then, the account management 53 sends (i) the refill resource identifier (vid) to be stored in the refill DB 56 to indicate that the account. In the mean time, after sending the update balance request (e), the refill AP 52 starts a timer (g). If the timer (g) expires without the refill AP having received an acknowledgement (cf. message 7 in FIG. 2) from the account management 53 that the account balance has been updated successfully, the refill AP sends (j) the "pending" notification 55 to the refill error correction module 60, which evaluates (k) which action to initiate as discussed in relation to FIG. 6*a*. The refill error correction module/function 60 initiates (l) correction by sending instructions to the refill AP which applies (m) the correction and sends (n) an acknowledgement to the RD 56 and updates (o) the status of the refill resource in the VDB to used.

Figure 7A:
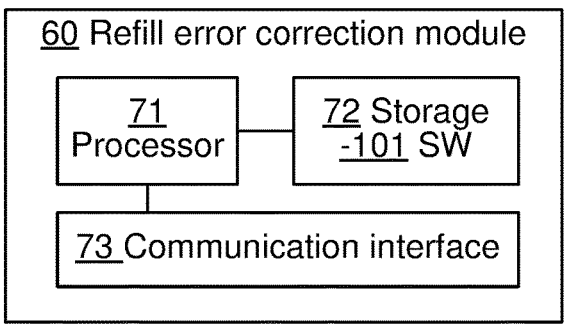
FIG. 7*a* is a schematic block diagram of an embodiment of a refill error correction module in accordance with the present disclosure.

FIG. 7*a* schematically illustrates an embodiment of a refill error correction module (for performing a refill error correction function) 60 of the present disclosure. The refill error correction module 60 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 101 (see also FIG. 10) stored in a storage 72 of one or several storage unit(s) e.g. a memory. The storage unit is regarded as a computer readable means 102 (see FIG. 10) as discussed herein and may e.g. be in the form of a Random Access Memory (RAM), a Flash memory or other solid state memory, or a hard disk, or be a combination thereof. The processor circuitry 71 may also be configured to store data in the storage 72, as needed. The refill error correction module 60 also comprises a communication interface 73 for communication with e.g. the refill AP 52.

According to an aspect of the present disclosure, there is provided a refill error correction module 60 for being related to an online charging system 50 for a cellular radio communication system. The refill error correction module comprises processor circuitry 71, and storage 72 storing instructions 101 executable by said processor circuitry whereby said refill error correction module is operative to obtain a notification 55 that a refill action of a user account for the communication system is pending, the notification comprising an identifier of a refill resource for the refill action. The refill error correction module is also operative to inspect a refill database 56 updated by an account management function 53 of the online charging system to determine whether the refill resource identifier is comprised therein, indicating whether the user account has been refilled based on the refill resource or not.

Figure 7B:
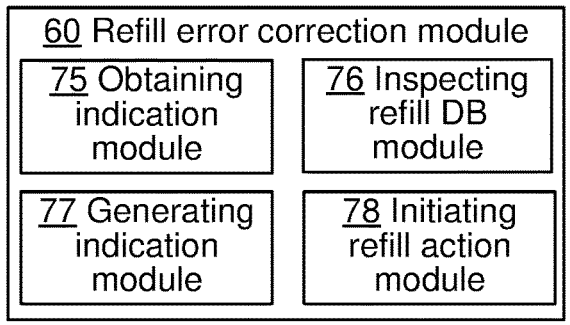
FIG. 7*b* is a schematic functional block diagram of an embodiment of a refill error correction module in accordance with the present disclosure.

FIG. 7b is a schematic block diagram functionally illustrating an embodiment of the refill error correction module 60 in FIG. 7a. As previously mentioned, the processor circuitry 71 may run software 101 for enabling the refill error correction module to perform an embodiment of a method of the present disclosure, whereby functional modules (could also be called submodules) may be formed in refill error correction module 60 e.g. in the processor circuitry 71 for performing the different steps of the method. These modules are schematically illustrated as blocks within refill error correction module 60. Thus, the refill error correction module comprises an obtaining indication module 75 for obtaining a notification 55 that a refill action of a user account for the communication system is pending, the notification comprising an identifier (vid) of a refill resource for the refill action. The refill error correction module also comprises an inspecting refill DB module 76 for inspecting a refill database 56 updated by an account management function 53 of the online charging system 50 to determine whether the refill resource identifier (vid) is comprised therein, indicating whether the user account has been refilled based on the refill resource or not. Optionally, the refill error correction module also comprises a generating indication module 77 for generating an indication (n) that the refill resource is used, indicating that the refill action is no longer pending. Additionally or alternatively, optionally, the refill error correction module also comprises an initiating refill action module 78 for initiating an additional refill action for the refill resource.

Figure 8A:
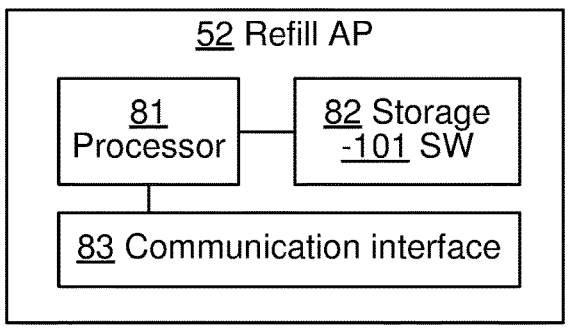
FIG. 8*a* is a schematic block diagram of an embodiment of a refill access point in accordance with the present disclosure.

FIG. 8a schematically illustrates an embodiment of a refill AP 52 of the present disclosure. The refill AP 52 comprises processor circuitry 81 e.g. a central processing unit (CPU). The processor circuitry 81 may comprise one or a plurality of processing units in the form of microprocessor(s). However, other suitable devices with computing capabilities could be comprised in the processor circuitry 81, e.g. an application specific integrated circuit (ASIC), a field programmable gate array (FPGA) or a complex programmable logic device (CPLD). The processor circuitry 81 is configured to run one or several computer program(s) or software (SW) 101 (see also FIG. 10) stored in a storage 82 of one or several storage unit(s) e.g. a memory. The storage unit is regarded as a computer readable means 102 (see FIG. 10) as discussed herein and may e.g. be in the form of a Random Access Memory (RAM), a Flash memory or other solid state memory, or a hard disk, or be a combination thereof. The processor circuitry 81 may also be configured to store data in the storage 82, as needed. The refill AP 52 also comprises a communication interface 83 for communication with e.g. the refill error correction module 60 and the account management module 53.

According to an aspect of the present disclosure, there is provided a refill access point 52 for being associated with an online charging system 50 for a cellular radio communication system. The refill access point comprises processor circuitry 81, and storage 82 storing instructions 101 executable by said processor circuitry whereby said refill access point is operative to determine that a refill action of a user account for the communication system is pending. The refill access point is also operative to generate a notification 55 to a refill error correction function 60, the notification comprising an identifier (vid) of a refill resource for the pending refill action.

Figure 8B:
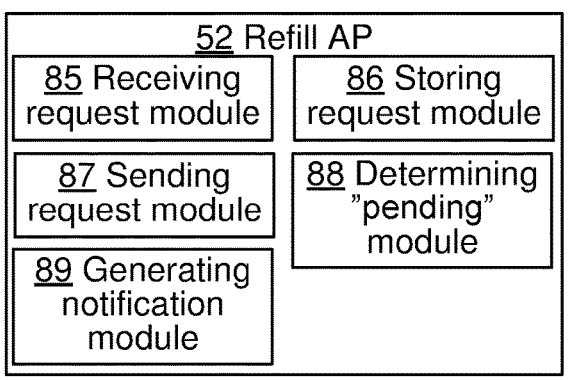
FIG. 8*b* is a schematic functional block diagram of an embodiment of a refill access point in accordance with the present disclosure.

FIG. 8b is a schematic block diagram functionally illustrating an embodiment of the refill access point 52 in FIG. 8a. As previously mentioned, the processor circuitry 81 may run software 101 for enabling the refill access point 52 to perform an embodiment of a method of the present disclosure, whereby functional modules (could also be called submodules) may be formed in refill access point 52 e.g. in the processor circuitry 81 for performing the different steps of the method. These modules are schematically illustrated as blocks within refill access point 52. Thus, the refill AP comprises a determining "pending" module 88 for determining that a refill action of a user account for the communication system is pending, and a generating notification module 89 for generating a notification 55 to a refill error correction function 60, the notification comprising an identifier (vid) of a refill resource for the pending refill action. Optionally, the refill AP may also comprise a receiving request module 85 for receiving a refill request (a) for the refill action, e.g. from a radio device 57 connected to the cellular radio communication system, the refill request comprising the refill resource identifier (vid), and a sending request module 87 for sending an update balance request (e) to an account management function 53 of the online charging system 50, the update account request comprising the refill resource identifier (vid). Optionally, the refill AP may also comprise a storing request module 86 for storing information (b) about the refill request (a) in a request database 54.

Figure 9A:
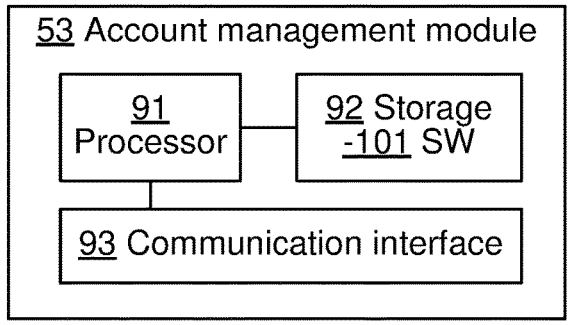
FIG. 9*a* is a schematic block diagram of an embodiment of an account management module in accordance with the present disclosure.

FIG. 9a schematically illustrates an embodiment of an account management module (for performing an account management function) 53 of the present disclosure. The account management module 53 comprises processor circuitry 91 e.g. a central processing unit (CPU). The processor circuitry 91 may comprise one or a plurality of processing units in the form of microprocessor(s). However, other suitable devices with computing capabilities could be comprised in the processor circuitry 91, e.g. an application specific integrated circuit (ASIC), a field programmable gate array (FPGA) or a complex programmable logic device (CPLD). The processor circuitry 91 is configured to run one or several computer program(s) or software (SW) 101 (see also FIG. 10) stored in a storage 92 of one or several storage unit(s) e.g. a memory. The storage unit is regarded as a computer readable means 102 (see FIG. 10) as discussed herein and may e.g. be in the form of a Random Access Memory (RAM), a Flash memory or other solid state memory, or a hard disk, or be a combination thereof. The processor circuitry 91 may also be configured to store data in the storage 92, as needed. The account management module 53 also comprises a communication interface 93 for communication with e.g. the Refill AP 52.

According to an aspect of the present disclosure, there is provided an account management module 53 for an online charging system 50 for a cellular radio communication system. The account management module comprises processor circuitry 91, and storage 92 storing instructions 101 executable by said processor circuitry whereby said account management module is operative to obtain an update balance request (e) for a refill action of a user account for the communication system, the request comprising an identifier (vid) of a refill resource for the refill action. The account management module is also operative to initiate updating a balance of the user account in accordance with the refill action. The account management module is also operative to update a refill database 56 by including the refill resource identifier (vid). The account management module is also operative to send a confirmation message confirming that the user account has been refilled based on the refill resource (cf. the acknowledgement 7 in FIG. 2).

Figure 9B:
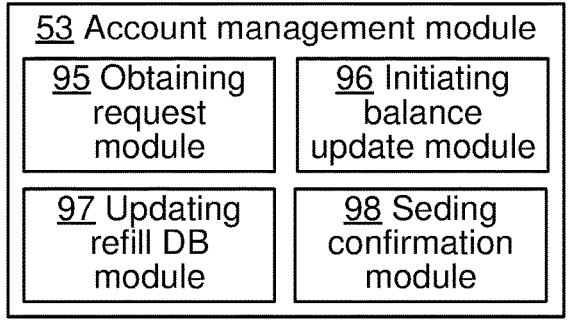
FIG. 9*b* is a schematic functional block diagram of an embodiment of an account management module in accordance with the present disclosure.

FIG. 9b is a schematic block diagram functionally illustrating an embodiment of the account management module 53 in FIG. 9a. As previously mentioned, the processor circuitry 91 may run software 101 for enabling the account management module 53 to perform an embodiment of a method of the present disclosure, whereby functional modules (could also be called submodules) may be formed in account management module 53 e.g. in the processor circuitry 91 for performing the different steps of the method. These modules are schematically illustrated as blocks within account management module 53. Thus, the account management module 53 comprises an obtaining request module 95 for obtaining an update balance request (e) for a refill action of a user account for the communication system, the request comprising an identifier (vid) of a refill resource for the refill action. The account management module 53 also comprises an initiating balance update module 96 for initiating updating a balance of the user account in accordance with the refill action. The account management module 53 also comprises an updating refill DB module 97 for updating a refill database 56 by including the refill resource identifier (vid). The account management module 53 also comprises a sending confirmation module 98 for sending a confirmation message confirming that the user account has been refilled based on the refill resource.

Figure 10:
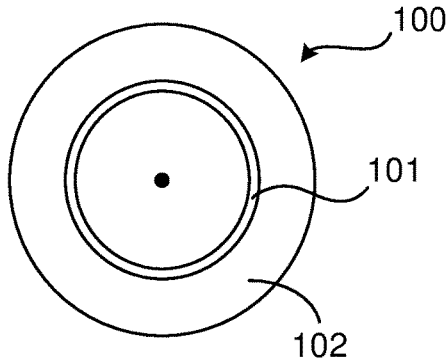
FIG. 10 is a schematic illustration of an embodiment of a computer program product in accordance with the present disclosure.

FIG. 10 illustrates an embodiment of a computer program product 100. The computer program product 100 comprises a computer readable (e.g. non-volatile and/or non-transitory) medium 102 comprising software/computer program 101 in the form of computer-executable components. The computer program 101 may be configured to cause a device, e.g. comprising a refill error correction module 60, a refill AP 51 and/or an account management module 53 as discussed herein, to perform an embodiment of a method of the present disclosure. The computer program may be run on the processor circuitry 71/81/91 of the device for causing it to perform the method. The computer program product 100 may e.g. be comprised in a storage unit or memory 72/82/92 comprised in the device and associated with the processor circuitry. Alternatively, the computer program product 100 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 100 comprising computer-executable components 101 for causing a refill error correction module 60 to perform an embodiment of a method of the present disclosure when the computer-executable components are run on processor circuitry 71 comprised in the refill error correction module.

According to another aspect of the present disclosure, there is provided a computer program product 100 comprising computer-executable components 101 for causing a refill access point 52 to perform an embodiment of a method of the present disclosure when the computer-executable components are run on processor circuitry 81 comprised in the refill access point.

According to another aspect of the present disclosure, there is provided a computer program product 100 comprising computer-executable components 101 for causing an account management module 53 to perform an embodiment of a method of the present disclosure when the computer-executable components are run on processor circuitry 91 comprised in the account management module.

According to another aspect of the present disclosure, there is provided a computer program 101 comprising computer program code which is able to, when run on processor circuitry 71 of a refill error correction module 60 related to an online charging system 50 for a cellular radio communication system, cause the refill error correction module to obtain a notification 55 that a refill action of a user account for the communication system is pending, the notification comprising an identifier (vid) of a refill resource for the refill action. The code is also able to cause the refill error correction module 60 to inspect a refill database 56 updated by an account management function 53 of the online charging system 50 to determine whether the refill resource identifier (vid) is comprised therein, indicating whether the user account has been refilled based on the refill resource or not.

According to another aspect of the present disclosure, there is provided a computer program 101 comprising computer program code which is able to, when run on processor circuitry 81 of a refill access point 52 associated with an online charging system 50 for a cellular radio communication system, cause the refill access point to determine that a refill action of a user account for the communication system is pending. The code is also able to cause the refill access point to generate a notification 55 to a refill error correction module/function 60, the notification comprising an identifier (vid) of a refill resource for the pending refill action.

According to another aspect of the present disclosure, there is provided a computer program 101 comprising computer program code which is able to, when run on processor circuitry 91 of an account management module 53 for an online charging system 50 for a cellular radio communication system, cause the account management module 53 to obtain an update balance request (e) for a refill action of a user account for the communication system, the request comprising an identifier (vid) of a refill resource for the refill action. The code is also able to cause the account management module 53 to initiate updating a balance of the user account in accordance with the refill action. The code is also able to cause the account management module to update a refill database 56 by including the refill resource identifier (vid). The code is also able to cause the account management module to send a confirmation message confirming that the user account has been refilled based on the refill resource.

According to another aspect of the present disclosure, there is provided a computer program product 100 comprising an embodiment of a computer program 101 of the present disclosure and a computer readable means 102 on which the computer program is stored.

Figure 11A:
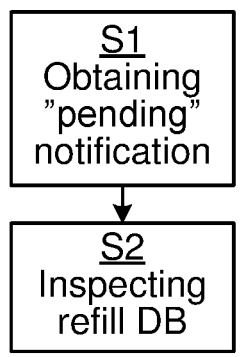
FIG. 11*a* is a schematic flow chart of an embodiment of a method in accordance with the present disclosure.

FIG. 11a schematically illustrates an embodiment of a method of the present disclosure. The method may be performed by a refill error correction module/function 60 as discussed herein. The method relates to an online charging system 50 for a cellular radio communication system. The method comprises obtaining S1 a notification 55 that a refill action of a user account for the communication system is pending. The notification comprises an identifier (vid) of a refill resource for the refill action. The method also comprises inspecting S2 a refill database 56 updated by an account management function 53 of the online charging system 50 to determine whether the refill resource identifier (vid) is comprised therein, indicating whether the user account has been refilled based on the refill resource or not.

Figure 11B:
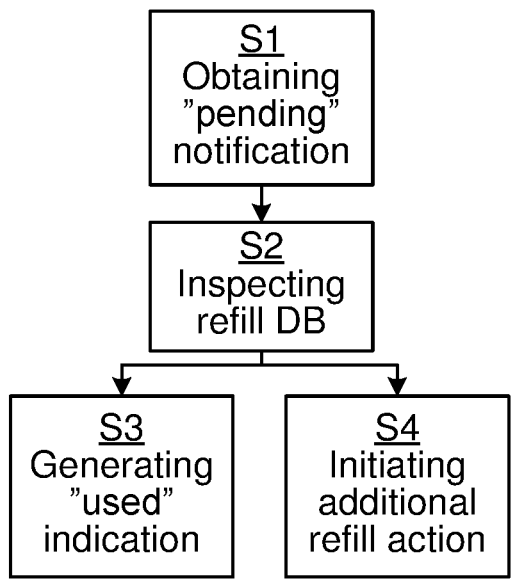
FIG. 11*b* is a schematic flow chart of another embodiment of a method in accordance with the present disclosure.

The method may in some embodiments, as illustrated in FIG. 11b, also comprise generating S3 an indication (n) that the refill resource is used (if the inspecting S2 comprises determining that the refill resource identifier (vid) is comprised in the refill database 56), indicating that the refill action is no longer pending, or initiating S4 an additional refill action for the refill resource (if the inspecting S2 comprises determining that the refill resource identifier (vid) is not comprised in the refill database 56). In some embodiments, the initiating S4 an additional refill action comprises reconstructing a refill request (a) based on information in a request database 54 comprising the refill resource identifier (vid). Additionally or alternatively, in some embodiments, additional refill action(s) are initiated S4 until inspection S2 of the refill database 56 determines that the refill resource identifier (vid) is comprised therein or until a predetermined number of the additional refill action(s) have been initiated S4.

In some embodiments, the notification 55 that the refill action is pending is obtained S1 as a result of a confirmation message confirming successful refill of the user account based on the refill resource has not been received before the expiry of a timer (f).

In some embodiments of the present invention, the account management function is an Account Balance Management Function in accordance with a 3GPP standard.

In some embodiments of the present invention, the notification is obtained from a Recharging Server in accordance with a 3GPPs standard.

Figure 12A:
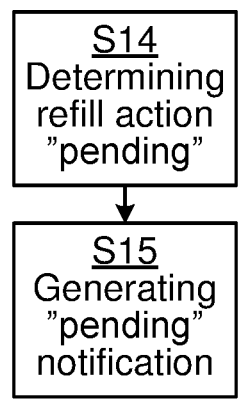
FIG. 12*a* is a schematic flow chart of an embodiment of a method performed by a refill access point, in accordance with the present disclosure.

FIG. 12a is a schematic flow chart of an embodiment of a method performed in a refill AP 52, in accordance with the present disclosure. The method comprises determining S14 that a refill action of a user account for the communication system is pending. The method also comprises generating S15 a notification 55 to a refill error correction function 60. The notification comprises an identifier (vid) of a refill resource for the pending refill action.

Figure 12B:
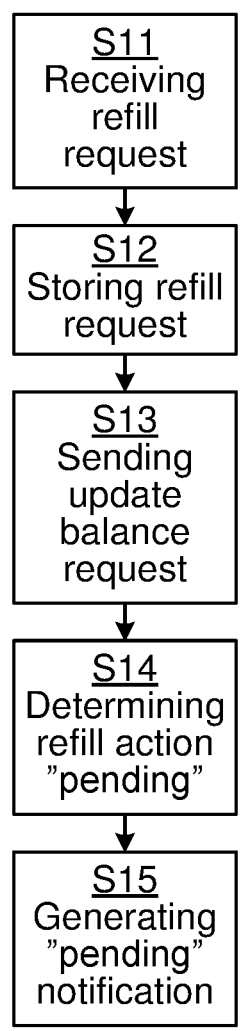
FIG. 12*b* is a schematic flow chart of another embodiment of a method performed by a refill access point, in accordance with the present disclosure.

Optionally, as illustrated in FIG. 12b, the method may further comprise receiving S11 a refill request (a) for the refill action, e.g. from a radio device 57 connected to the cellular radio communication system, the refill request comprising the refill resource identifier (vid), and sending S13 an update balance request (e) to an account management function 53 of the online charging system 50, the update account request comprising the refill resource identifier (vid). In some embodiments, the method may also comprise storing S12 information (b) about the refill request (a) in a request database 54.

In some embodiments, the determining S14 that the refill action is pending comprises determining that a timer (f) has expired before receiving a confirmation message confirming that the user account has been refilled based on the refill resource.

Figure 13:
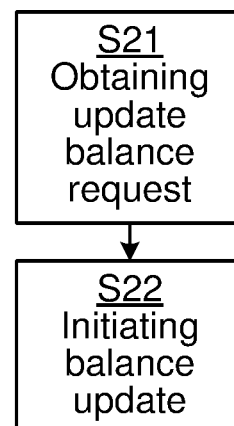
FIG. 13 is a schematic flow chart of an embodiment of a method performed by an account management function, in accordance with the present disclosure.
Figure 13:

FIG. 13 is a schematic flow chart of an embodiment of a method performed by a method performed by an account management module/function 53 of an online charging system 50 for a cellular radio communication system. The method comprises obtaining S21 an update balance request (e) for a refill action of a user account for the communication system, the request comprising an identifier (vid) of a refill resource for the refill action. The method also comprises initiating S22 updating a balance of the user account in accordance with the refill action. The method also comprises updating S23 a refill database 56 by including the refill resource identifier (vid). The method also comprises sending S24 a confirmation message confirming that the user account has been refilled based on the refill resource.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method related to an online charging system for a cellular radio communication system, the method comprising:

obtaining a notification that a refill action of a user account for the communication system is pending, the notification comprising an identifier of a refill resource for the refill action; and inspecting a refill database updated by an account management function of the online charging system to determine whether the refill resource identifier is comprised therein, and when the inspecting includes determining that the refill resource identifier is not in the refill database, then initiating additional refill actions for the refill resource until one of:

inspection of the refill database determines that the refill resource identifier is comprised therein; and a predetermined number of the additional refill actions have been initiated; and indicating whether the user account has been refilled based on the refill resource.

2. The method of claim 1, wherein the notification that the refill action is pending is obtained as a result of a confirmation message confirming successful refill of the user account based on the refill resource has not been received before the expiry of a timer.

3. The method of claim 1, wherein the inspecting comprises determining that the refill resource identifier is comprised in the refill database, the method further comprising:

generating an indication that the refill resource is used, indicating that the refill action is no longer pending.

4. The method of claim 1, wherein the initiating an additional refill action comprises reconstructing a refill request based on information in a request database comprising the refill resource identifier.

5. The method of claim 1, wherein the method is performed by a refill error correction function in a telecommunication operator support network.

6. The method of claim 1, wherein the account management function is an Account Balance Management Function in accordance with a Third Generation Partnership Project (3GPP) standard.

7. The method of claim 1, wherein the notification is obtained from a Recharging Server in accordance with a Third Generation Partnership Project (3GPP) standard.

8. A refill error correction module for being related to an online charging system for a cellular radio communication system, the refill error correction module comprising:

processor circuitry; and storage storing instructions executable by the processor circuitry, the refill error correction module being configured to:

obtain a notification that a refill action of a user account for the communication system is pending, the notification comprising an identifier of a refill resource for the refill action; and inspect a refill database updated by an account management function of the online charging system to determine whether the refill resource identifier is comprised therein, and when the inspecting includes determining that the refill resource identifier is not in the refill database, then initiating additional refill actions for the refill resource until one of:

inspection of the refill database determines that the refill resource identifier is comprised therein; and a predetermined number of the additional refill actions have been initiated; and indicating whether the user account has been refilled based on the refill resource.

* * * * *